United States Patent [19]

Olson et al.

[11] 4,353,959

[45] Oct. 12, 1982

[54] ABRASION RESISTANT SILICONE COATED POLYCARBONATE ARTICLE HAVING AN ACRYLIC PRIMER LAYER CONTAINING A U.V. ABSORBING COMPOUND

[75] Inventors: Daniel R. Olson, Schenectady, N.Y.; John C. Goossens, Mt. Vernon, Ind.

[73] Assignee: General Electric Company, Pittsfield, Mass.

[21] Appl. No.: 106,264

[22] Filed: Dec. 21, 1979

[51] Int. Cl.³ .................. B32B 27/08; B32B 27/18; B32B 27/20; G02B 1/04

[52] U.S. Cl. .................................. 428/331; 428/412; 428/413; 428/447; 428/448; 428/451

[58] Field of Search ............... 428/412, 447, 448, 451, 428/331, 413

[56] References Cited

U.S. PATENT DOCUMENTS

| | | |
|---|---|---|
| 3,582,398 | 6/1971 | Ringler . |
| 3,707,397 | 12/1972 | Gagnow . |
| 3,968,305 | 7/1976 | Oshima et al. .................. 428/334 |
| 3,968,309 | 7/1976 | Matsuo et al. .................. 428/409 |
| 3,978,178 | 8/1976 | Oshima et al. .................. 264/25 |
| 3,986,997 | 10/1976 | Clark . |
| 4,027,073 | 5/1977 | Clark .......................... 428/412 |
| 4,041,120 | 8/1977 | Oshima et al. .................. 264/171 |
| 4,045,602 | 8/1977 | Sommer et al. .................. 427/386 |
| 4,207,357 | 6/1980 | Goosens ........................ 427/162 |
| 4,210,699 | 7/1980 | Schroeter et al. ............... 428/331 |
| 4,242,381 | 12/1980 | Goosens et al. ................. 428/412 |
| 4,284,685 | 8/1981 | Olson .......................... 428/331 |

*Primary Examiner*—James C. Cannon
*Attorney, Agent, or Firm*—William F. Mufatti

[57] ABSTRACT

A shaped, non-opaque coated polycarbonate article having improved abrasion and chemical solvent resistance comprising a polycarbonate substrate having disposed on the surface thereof a non-opaque primer layer comprised of from about 25 to about 85 weight percent of a thermoset acrylic polymer and from about 15 to about 75 weight percent of at least one ultraviolet light screening compound, and disposed on said primer layer a non-opaque top coat comprised of a colloidal silica filled thermoset organopolysiloxane.

24 Claims, No Drawings

ABRASION RESISTANT SILICONE COATED POLYCARBONATE ARTICLE HAVING AN ACRYLIC PRIMER LAYER CONTAINING A U.V. ABSORBING COMPOUND

This invention relates to non-opaque abrasion and chemical solvent resistant colloidal silica filled thermoset organopolysiloxane coated shaped polycarbonate articles wherein the colloidal silica filled organopolysiloxane top coat is uniformly and tenaciously adhered to the polycarbonate substrate. More particularly, the present invention relates to a colloidal silica-filled organopolysiloxane coated polycarbonate article having a primer layer disposed between the polycarbonate substrate and the colloidal silica-filled organopolysiloxane top coat, said primer layer comprising from about 25 to about 85 weight percent of a thermoset acrylic polymer and from about 15 to about 75 weight percent of at least one ultraviolet light screening compound.

BACKGROUND OF THE INVENTION

The use of transparent glazing materials utilizing polycarbonate resin as a structural component for windows, windshields, and the like are well known. While these polycarbonate resins are easily fabricated into the desired shape and have excellent physical and chemical properties, such as being less dense than glass and having more breakage resistance than glass, their abrasion and chemical solvent resistance is relatively low.

In order to overcome this relatively low abrasion resistance and to otherwise improve the surface characteristics of the polycarbonate, various coatings have been applied onto the polycarbonate substrate. U.S. Pat. No. 3,582,398 describes a fabricated polycarbonate part having improved optical properties consisting of a polycarbonate substrate having a transparent coating thereon consisting of a thermoplastic polymethyl methacrylate. U.S. Pat. No. 4,061,652 describes a coating for polycarbonate resins comprised of (i) an acrylic resin which is a mixture of olefinically unsaturated organic monomers in combination with an acrylic polymer, and (ii) certain urethanes of hydroxybenzotriazoles and hydroxybenzophenones in combination with certain catalysts. U.S. Pat. Nos. 3,451,838, 3,986,997 and 4,027,073 disclose organopolysiloxane coating compositions and techniques for the application of these organopolysiloxane coatings onto polycarbonate surfaces. While these coatings have many desirable properties, e.g., they are hard, abrasion resistant, and chemical solvent resistant, these organopolysiloxane coatings do not in all instances possess the requisite degree of uniform adherence to and durability on these polycarbonate surfaces. U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface. This reference further teaches that the thickness of the thermosettable acrylic polymer primer layer varies between 0.01 mil up to as much as 0.5 mil or even more.

However, organopolysiloxane coated polycarbonate articles which contain a thermoset acrylic primer have suffered from the problem of loss of adhesion of the organopolysiloxane top coat to the polycarbonate substrate upon exposure to weathering.

It has now been discovered that if the primer layer is loaded with high amounts of ultraviolet light screeners, i.e., contains from about 15 to about 75 weight percent of at least one ultraviolet light screening or absorbing compound, then the adhesion of the organopolysiloxane top coat is not deleteriously affected upon exposure to weathering.

DESCRIPTION OF THE INVENTION

This invention relates to non-opaque colloidal silica-filled organopolysiloxane coated polycarbonate articles having an adhesion promoting primer layer containing from about 25 to about 85 weight percent of a thermoset acrylic polymer and from about 15 to about 85 weight percent of at least one ultraviolet light screening compound disposed between the polycarbonate surface and the colloidal silica-filled thermoset organopolysiloxane top coat.

In the practice of the present invention, prior to the application of the colloidal silica-filled organopolysiloxane coating to the polycarbonate surface, the surface is first primed by the application thereon of a primer layer of controlled thickness containing a thermoset acrylic polymer.

The aromatic carbonate polymers of the instant invention are known compounds and have recurring units of the formula:

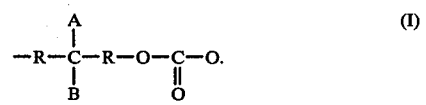

wherein each —R— is selected from the group consisting of phenylene, halo-substituted phenylene and alkyl substituted phenylene; and A and B are each selected from the group consisting of hydrogen, hydrocarbon radicals, free from aliphatic unsaturation and of radicals which together with the adjoining

atom form a cycloalkane radical, the total number of carbon atoms in A and B being up to 12.

These aromatic carbonate polymers may be prepared by methods well known in the art and described in U.S. Pat. Nos. 3,989,672, 3,275,601 and 3,028,365, all of which are incorporated herein by reference.

In the practice of this invention, any of the aromatic polycarbonates can be employed herein. However, particularly useful are the aromatic polycarbonates prepared by reacting a dihydric phenol, such as bisphenol-A (2,2-bis(4-hydroxyphenyl)propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-(3,5,3',5'-tetrabromo-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane. Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The thermosettable acrylic polymers which are contained in the primer compositions are well known in the art. Exemplary thermosettable acrylics which may be utilized in the practice of this invention are set forth in *Encyclopedia of Polymer Science and Technology,* Vol. 1, Interscience Publishers, John Wiley & Sons, Inc., at p. 273 et seq., and in the *Chemistry of Organic Film Formers,* by D. H. Solomon, John Wiley & Sons, Inc., 1967, at p. 251 et seq., and the references cited therein, all of which are hereby incorporated herein by reference.

Generally, the term "thermosettable acrylics" as used herein includes an acrylic polymer or copolymer having reactive functional groups which are capable of reacting between themselves to effect a cross-linkage thereof. These functional groups may be the same, provided they are of the type which will react between themselves, or the polymer or copolymer may contain two or more different types of reactive functional groups, such as, for example, an epoxide group and a carboxyl group. The term "thermosettable acrylics" also includes acrylic polymers or copolymers having a reactive functional group to which there is added an appropriate cross-linking agent which reacts with the functional group to effect cross-linking. The term "thermosettable acrylics" still further includes a mixture of two or more polymers containing cross-linkable functional reactive groups. These polymers may be acrylic polymers or copolymers having reactable, cross-linkable, functional groups thereon, or at least one of the polymers may be an acrylic polymer or copolymer having a reactive functional group and the other polymer or copolymer may be one or more other types of known polymers having functional groups which are reactive with the acrylic functional group to provide the thermoset product as a result of cross-linking.

Typically, the reactions involved in cross-linking the thermosettable acrylic polymers are reactions between, for example, epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups; interreaction between carboxyl and isocyanate groups; reactions between hydroxyl, for example polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butyl-aminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_3$) alkyl acrylic ester or mixtures thereof, e.g., methyl acrylate, ethyl acrylate, methyl methacrylate, ethyl methacrylate, or mixtures thereof, in an amount ranging between about 75 parts to about 99 parts and, more typically, between about 80 parts to about 97 parts.

The thermosettable acrylics are in general applied from primer compositions containing (i) the thermosettable acrylics and the ultraviolet light absorber dissolved in an organic or inorganic solvent, or (ii) an emulsion containing the thermosettable acrylics, the ultraviolet light absorber, an alcohol and water. In the case wherein the primer composition contains a thermosettable acrylic dissolved in an organic solvent, the solvent should generally be relatively volatile and inert, i.e., one that will not readily react with or too deleteriously affect the polycarbonate substrate, but which is capable of dissolving the thermosettable acrylic.

The primer compositions contain sufficient thermosettable acrylic polymer and ultraviolet light absorber to provide a primer layer containing from about 25 to about 85 weight percent thermoset acrylic polymer and from about 15 to about 75 weight percent of the ultraviolet light absorbing compound. Generally, this requires that the primer compositions contain from about 1 to about 20 weight percent of thermosettable acrylic solids and a sufficient amount of an ultraviolet light absorbing system to provide a thermosettable acrylic solids to ultraviolet light absorber weight ratio of from about 1:0.2 to about 1:3. The ultraviolet light absorbing system can be one which contains only one ultraviolet light absorbing compound or it can contain a mixture of two or more ultraviolet light absorbing compounds.

The ultraviolet light absorbing compounds are well known in the art and are compounds which act to absorb or screen out the ultraviolet radiation. Illustrative of these compounds are those of the hydroxy benzophenone and benzotriazole series, the cyanoacrylates and the benzylidene malonates. Examples of these include: 2-hydroxy-4-n-octoxybenzophenone, substituted hydroxyphenylbenzotriazole, 2-(2'-hydroxy-5'-methylphenyl)benzotriazole, 2-hydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2-(2'-hydroxy-5'-tert-butylphenyl)benzotriazole, 2-(2'-hydroxy-3'-methyl-5'-tert-butylphenyl)benzotriazole, 2-(2'-hydroxy-5'-cyclohexylphenyl)-benzotriazole, 2-(2'-hydroxy-3',5'-dimethylphenyl)benzotriazole, ethyl 3,3-diphenyl-2-cyanoacrylate, and octyl 3,3-diphenyl-2-cyanoacrylate. Further examples of ultraviolet light absorbers which may be used in the practice of this invention may be found in U.S. Pat. No. 3,043,079 which is incorporated herein by reference.

The primer compositions of the instant invention may also optionally contain various flatting agents, stabilizers such as antioxidants, surface-active agents and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface active agent and stabilizing agent, can be used.

The various surface-active agents, including anionic, cationic and nonionic surface-active agents are described in *Kirk-Othmer Encyclopedia of Chemical Technology*, Vol. 19, Interscience Publishers, New York, 1969, pp. 507–593, and *Encyclopedia of Polymer Science and Technology*, Vol. 13, Interscience Publishers, New York, 1960, pp. 477–486, both of which are references and incorporated herein.

A uniform film of the primer composition containing the further curable thermosettable acrylic and the ultraviolet light absorbing system is applied onto the polycarbonate surface by any of the known means such as dipping, spraying, roll-coating and the like. After the formed polycarbonate part is coated with the primer composition, the inert volatile solvent is removed by drying the coated article until a substantial portion of the volatile solvent evaporates leaving a solid residue, and thereafter heat is applied to thermoset the thermosettable acrylic, thereby forming a primer layer or coating containing the thermoset acrylic and the ultraviolet light absorbing system on the polycarbonate surface to which the primer composition was applied. This primer layer contains from about 25 to about 85 weight percent of the thermoset acrylic polymer and from about 15 to about 75 weight percent of the ultraviolet light absorbing system, i.e., at least one ultraviolet light absorbent compound; preferably from about 25 to about 80 weight percent of the thermoset acrylic polymer and from about 20 to about 75 weight percent of the ultraviolet light absorbing system; more preferably, from about 25 to about 75 weight percent of the thermoset acrylic polymer and from about 25 to about 75 weight percent of the ultraviolet light absorbing system; and most preferably from about 25 to about 70 weight percent of the thermoset acrylic polymer and from about 30 to about 75 weight percent of the ultraviolet light absorbing system.

If the primer layer contains less than about 15 weight percent of the ultraviolet light absorber, there is no appreciable improvement in the durability of adhesion of the colloidal silica filled silicone top coat. If the primer layer contains more than about 75 weight percent of the ultraviolet light absorber, the adhesion promoting character of the primer begins to be adversely affected.

After the polycarbonate article which is to be coated with the top coat composition has been primed by the application of the primer composition and the evaporation of the solvent component of the primer composition and the thermosetting of the thermosettable acrylic, the primed surface of the polycarbonate article is then coated with the colloidal silica-filled organopolysiloxane coating. In the practice of this invention, a colloidal silica-filled organopolysiloxane coating composition containing a further-curable organopolysiloxane and colloidal silica is applied onto the cured primer and is then cured to form a thermoset colloidal silica-filled organopolysiloxane coating.

The colloidal silica-filled further-curable organopolysiloxane top coat composition is disclosed in U.S. Pat. Nos. 3,986,997 and 4,027,073 and comprises a dispersion of colloidal silica in a lower aliphatic alcohol-water solution of the partial condensate of a silanol having the formula $$R^4Si(OH)_3 \qquad (II).$$

wherein $R^4$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica-filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the acidic aqueous medium, there is condensation of the hydroxyl substituents to form —Si—O—Si— bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During curing of the top coating composition on the primer, these residual hydroxyl groups condense to give a silsesquioxane, $R^4SiO_{3/2}$.

The silica component of the top coat composition is present in the form of colloidal silica. Aqueous colloidal silica dispersions generally have a particle size in the range of 5 to 150 millimicrons in diameter. These silica dispersions are prepared by methods well known in the art and are commercially available. It is preferred to use colloidal silica having a particle size in the range of 10 to 30 millimicrons in diameter in order to obtain dispersions having a greater stability and to provide top coatings having superior optical properties.

The silica-filled organopolysiloxane top coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si-O-Si bonding. The condensation is not complete, resulting in a siloxane having an appreciable quantity of silicon-bonded hydroxyl group. This aged, silica-filled further-curable organopolysiloxane top coat composition is then applied onto the primed polycarbonate by any of the commonly known methods such as dipping, spraying, flow-coating and the like. After the top coat composition is applied to the primed polycarbonate, the polycarbonate is air dried to evaporate the volatile solvents from the top coat composition. Thereafter, heat is applied to cure the top coat. During curing, the residual hydroxyls of the siloxane codense to give a silsesquioxane, $R^4SiO_{3/2}$. The result is a silica-filled cross-linked organopolysiloxane top coat which is tenaciously adhered to the substrate and is highly resistant to scratching, abrasion, chemical solvents and marring. Generally, the top coat contains from about 10 to about 70 weight percent silica and from about 30 to about 90 weight percent of the organopolysiloxane present as the silsesquioxane, $R^4SiO_{3/2}$.

The thickness of the top coat generally is dependent upon the method of application and upon the weight percent solids present in the colloidal silica-filled further curable organopolysiloxane top coat composition. In general, the higher the percent solids, and the longer the application time, the greater the thickness of the top coat. It is preferred that the cured top coat have a thickness of from about 0.1 to about 0.5 mil, more preferably from 0.15 to about 0.4 mil, and most preferably from about 0.2 to about 0.25 mil.

PREFERRED EMBODIMENT OF THE INVENTION

In order that those skilled in the art may better understand how the present invention may be practiced, the following examples are given by way of illustration and not by way of limitation. Unless otherwise specified, all percentages and parts are by weight.

EXAMPLE 1

An aromatic polycarbonate is prepared by reacting 2,2-bis(4-hydroxyphenol)propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick.

A colloidal silica-filled further-curable organopolysiloxane top coat composition is prepared as follows: Glacial acetic acid (0.2 grams) is added to 200 grams of a commercially available aqueous dispersion of colloidal silica having an initial pH of 3.1 containing 34% $SiO_2$ of approximately 15 millimicron particle size and having a $Na_2O$ content of less then 0.01 weight percent. Methyltrimethoxysilane (138 grams) is added to the stirred acidified dispersion generating methanol and methyltrisilanol. After standing for about one hour, the pH of the composition stabilizes at 4.5. The pH of the composition is adjusted to a range of from 3.7 to 5.6. The composition is aged for 4 days to ensure formation of the partial condensate of $CH_3Si(OH)_3$ in the silica methanol-water dispersion. The composition contains 40% solids, half of which is $SiO_2$ and the other half silicone calculated on the basis $CH_3SiO_{3/2}$ weight available in the cured composition. The aged composition is diluted to 25 weight % solids by addition of isopropanol.

EXAMPLE 2

This Example illustrates a primed and top coated polycarbonate article falling outside the scope of the instant invention in that no ultraviolet light absorbing compound is present in the primer layer.

A solution of 20 parts by weight of methyl methacrylate, 20 parts by weight of ethyl methacrylate, 0.6 parts by weight of methacrylic acid and 0.1 parts by weight of 2,2'-azobisisobutyronitrile in 160 parts by weight of butoxyethanol is stirred, under nitrogen at 100° C. for 36 hours.

A thermosettable acrylic primer formulation, hereinafter referred to as primer formulation B, is made by combining 40 parts by weight of the afore-described solution with 0.5 parts by weight of hexamethoxymethylmelamine, 0.03 parts by weight of toluenesulfonic acid, and 160 parts by weight of butoxyethanol.

Polycarbonate test panels prepared in accordance with the procedure of Example 1 are flow coated with this primer formulation B, are drained for 10 minutes, and then are baked at 125° C. for 30 minutes. After cooling the primed test panels are flow coated with the colloidal silica filled organopolysiloxane top coat composition prepared substantially in accordance with the procedure set forth above. Excess top coat solution is drained off and the panels are air dried for 30 minutes. The panels are then baked for 1 hour at 125° C. to cure the colloidal silica filled further curable organopolysiloxane. The primed and top coated test panels are subjected to an adhesion test, before weathering and after weathering for 503 hours, and the results are set forth in TABLE I.

The adhesion test consists of using a multiple blade tool to cut parallel goooves about 1 mm apart through the top coat and primer layer into the substrate, rotating the sample 90° and repeating the cutting process thereby forming a grid pattern of 1 mm squares cut into the coating, and applying an adhesive tape over the cross-hatched area and quickly pulling said tape off (a sample fails the adhesion test if any of the squares in the grid are pulled off). The weathering consists of placing the test panels in a QUV accelerating weathering tester, sold by Q-Panel Company, which is set to cycles of 8 hours of fluorescent ultraviolet light at about 70° C. and 4 hours of dark/condensation at about 60° C.

EXAMPLE 3

This Example illustrates a primed and top coated polycarbonate article falling outside the scope of the instant invention in that the primer layer contains about 9 weight percent of an ultraviolet light absorber.

A thermosettable acrylic primer fomulation containing a low amount of a benzotriazole ultraviolet light absorber is prepared by combining 20 parts by weight of the thermosettable acrylic primer formulation B of Example 2 with 0.08 parts by weight of Cyasorb 5411 (a benzotriazole ultraviolet light absorber sold by American Cyanamid). Test panels prepared in accordance with the procedure of Example 1 are primed with this primer formulation and top coated in accordance with the procedure set forth in Example 2. These primed and top coated test panels are subjected to the adhesion test, before and after weathering, and the results are set forth in TABLE I.

EXAMPLE 4

A thermosettable acrylic primer formulation containing a high amount of a cyanoacrylate ultraviolet light absorber is prepared by combining 19.8 parts by weight of the thermosettable acrylic primer formulation B of Example 2 with 2.2 parts by weight of Uvinul N-539 (a cyanoacrylate ultraviolet light absorber sold by GAF Corporation). Test panels prepared in accordance with the procedure of Example 1 are primed with this primer formulation and top coated in accordance with the procedure set forth in Example 2. These primed and top coated test panels are subjected to the adhesion test, before and after weathering, and the results are set forth in TABLE I.

EXAMPLE 5

A thermosettable acrylic primer formulation containing a high amount of dihydroxybenzophenone ultraviolet light absorber is prepared by combining 19.8 parts by weight of the thermosettable acrylic primer formulation B of Example 2 with 2.2 parts by weight of 2,4-dihydroxybenzophenone. Test panels prepared substantially in accordance with the procedure of Example 1 are primed with this primer formulation and top coated in accordance with the procedure set forth in Example 2. These primed and top coated test panels are subjected to the adhesion test, before and after weathering, and the results are set forth in TABLE I.

EXAMPLE 6

A thermosettable acrylic primer formulation containing a high amount of a benzophenone ultraviolet light absorber is made by combining 19.8 parts by weight of the thermosettable acrylic primer formulation B of Example 2 with 2.2 parts by weight of Cyasorb 531 (a benzophenone ultraviolet light absorber sold by American Cyanamid). Test panels prepared in accordance with the procedure of Example 1 are primed with this primer formulation and top coated in accordance with the procedure set forth in Example 2. These primed and top coated test panels are subjected to the adhesion test, before and after weathering, and the results are set forth in TABLE I.

EXAMPLE 7

A thermosettable acrylic primer formulation containing a high amount of benzotriazole ultraviolet light screener is made by combining 19.95 parts by weight of the thermosettable acrylic primer formulation B of Example 2 with 1.05 parts by weight of Cyasorb 5411 (a benzotriazole ultraviolet light screener sold by American Cyanamid). Test panels prepared in accordance with the procedure of Example 1 are primed with this primer formulation and top coated in accordance with the procedure set forth in Example 2. These primed and top coated test panels are subjected to the adhesion test, before and after weathering, and the results are set forth in TABLE I.

TABLE I

| Example | Adhesion Test Before Weathering | Adhesion Test After 503 Hours of Weathering | Color of Test Panel After 503 Hours of Weathering |
|---|---|---|---|
| 2 | Pass | Fail | Yellow |
| 3 | Pass | Fail | Yellow |
| 4 | Pass | Pass | Colorless |
| 5 | Pass | Pass | Colorless |
| 6 | Pass | Pass | Colorless |
| 7 | Pass | Pass | Colorless |

As can be seen by comparison of Examples 2 (where the primer layer contains no ultraviolet light screener) and 3 (where the primer layer contains a relatively small amount, i.e., 9 weight percent, of an ultraviolet light screener) with Examples 4–7 (wherein the primer layer contains high amounts of an ultraviolet light screener), the pressure of relatively high amounts of an ultraviolet light screener in the primer layer greatly improves the adhesion of the colloidal silica filled thermoset organopolysiloxane containing top coat to the polycarbonate upon exposure to weathering. Thus, while the test panels of Examples 2 and 3 the top coat failed the adhesion test after 503 hours exposure to weathering, the adhesion of the top coat of test panels of Examples 4–7 was not deleteriously affected by exposure to weathering for this same period of time.

The foregoing disclosure of this invention is not to be considered as limiting, since many variations may be made by those skilled in the art without departing from the scope or spirit of the foregoing description.

What we claim as new and desire to secure by Letters Patent of the United States is:

1. An improved coated polycarbonate article having improved durability of adhesion of the coating to the polycarbonate comprising a polycarbonate substrate having adhered thereto on at least one surface thereof (i) an adhesion promoting primer layer containing a thermoset acrylic polymer, and (ii) a top coat disposed on said primer layer comprised of a collodal silica filled thermoset organopolysiloxane; the improvement consisting of said primer layer containing from about 15 to about 75 weight percent of at least one ultraviolet radiation absorbing compound and from about 25 to about 85 weight percent of a thermoset acrylic polymer.

2. The article of claim 1 wherein said primer layer contains from about 25 to about 80 weight percent of a thermoset acrylic polymer and from about 20 to about 75 weight percent of at least one ultraviolet light absorbing compound.

3. The article of claim 2 wherein said primer layer contains from about 25 to about 75 weight percent of a thermoset acrylic polymer and from about 25 to about 75 weight percent of at least one ultraviolet light absorbing compound.

4. The article of claim 3 wherein said primer layer contains from about 25 to about 70 weight percent of a thermoset acrylic polymer and from about 30 to about 75 weight percent of at least one ultraviolet light absorbing compound.

5. The article of claim 4 wherein said colloidal silica-filled thermoset organopolysiloxane is a condensation product of a silanol having the formula $RSi(OH)_3$, wherein R is selected from an alkyl radical of from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

6. The article of claim 5 wherein said colloidal silica-filled thermoset organopolysiloxane is the condensation product of $CH_3Si(OH)_3$.

7. The article of claim 5 wherein said colloidal silica-filled thermoset organopolysiloxane contains from about 10 to about 70 weight percent of colloidal silica.

8. The article of claim 6 wherein said thermoset silica-filled organopolysiloxane contains from about 10 to about 70 weight percent of colloidal silica.

9. An improved coated polycarbonate article having improved durability of adhesion of the coating to the polycarbonate comprising a polycarbonate substrate having adhered thereto on at least one surface thereof (i) an adhesion promoting primer layer containing a thermoset acrylic polymer, and (ii) disposed on said primer layer a top coat comprising the thermally cured product of a composition comprising a dispersion of collodal silica in a lower aliphatic alcohol-water solution of the partial condensate of at least one silanol, said composition containing 10 to 50 weight percent solids consisting essentially of 10 to 70 weight percent colloidal silica and 30 to 90 weight percent of the partial condensate; the improvement consisting of said primer layer containing from about 15 to about 75 weight percent of at least one ultraviolet radiation absorbing compound and from about 25 to about 85 weight percent of a thermoset acrylic polymer.

10. The article of claim 9 wherein said silanol has the formula $RSi(OH)_3$ wherein R is selected from alkyl radicals containing 1 to 3 carbon atoms, the vinyl radical, the 3,3,3-trifluoropropyl radical, the gamma-glycidoxypropyl radical and the gamma-methacryloxypropyl radical, at least 70 weight percent of said silanol being $CH_3Si(OH)_3$.

11. The article of claim 10 wherein said primer layer contains from about 25 to about 80 weight percent of a thermoset acrylic polymer and from about 20 to about 75 weight percent of at least one ultraviolet light absorbing compound.

12. The article of claim 11 wherein said primer layer contains from about 25 to about 75 weight percent of a thermoset acrylic polymer and from about 25 to about 75 weight percent of at least one ultraviolet light absorbing compound.

13. The article of claim 12 wherein said primer layer contains from about 25 to about 70 weight percent of a thermoset acrylic polymer and from about 30 to about 75 weight percent of at least one ultraviolet light absorbing compound.

14. The article of claim 13 wherein said silanol is $CH_3Si(OH)_3$.

15. An improved coated polycarbonate article having improved durability of adhesion of the coating to the polycarbonate comprising a polycarbonate substrate having adhered thereto on at least one surface thereof (i) an adhesion promoting primer layer containing a thermoset acrylic polymer, and (ii) disposed on said primer layer a top coat comprising the thermally cured product of a dispersion of collodal silica in a lower aliphatic alcohol-water solution of the partial condensate of a silanol of the formula $RSi(OH)_3$ wherein R is selected from alkyl radicals containing 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$ radical, said composition containing 10 to 50 weight percent solids consisting essentially of 10 to 70 weight percent colliodal silica and 30 to 90 weight percent of the partial condensate, said-composition containing sufficient acid to provide a pH in the range of 3.0 to 6.0; the improvement consisting of said primer layer containing from about 15 to about 75 weight percent of at least one ultraviolet radiation absorbing compound and from about 25 to about 85 weight percent of a thermoplastic acrylic polymer.

16. The article of claim 15 wherein said primer layer contains from about 25 to about 80 weight percent of a thermoset acrylic polymer and from about 20 to about 75 weight percent of at least one ultraviolet light absorbing compound.

17. The article of claim 16 wherein said primer layer contains from about 25 to about 75 weight percent of a thermoset acrylic polymer and from about 25 to about 75 weight percent of at least one ultraviolet light absorbing compound.

18. The article of claim 17 wherein said primer layer contains from about 25 to about 70 weight percent of a thermoset acrylic polymer and from about 30 to about 75 weight percent of at least one ultraviolet light absorbing compound.

19. The article of claim 18 wherein said silanol is $CH_3Si(OH)_3$.

20. An improved coated polycarbonate article having improved durability of adhesion of the coating to the polycarbonate comprising a polycarbonate substrate having adhered thereo on at least one surface thereof (i) an adhesion promoting primer layer containing a thermoset acrylic polymer, and (ii) disposed on said primer layer a top coat composition comprising a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of said silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0; the improvement consisting of said primer layer containing from about 15 to about 75 weight percent of at least one ultraviolet radiation absorbing compound and from about 28 to about 85 weight percent of a thermoset acrylic polymer.

21. The article of claim 20 wherein said primer layer contains from about 25 to about 80 weight percent of a thermoset acrylic polymer and from about 20 to about 75 weight percent of at least one ultraviolet light absorber.

22. The article of claim 21 wherein said primer layer contains from about 25 to about 75 weight percent of a thermoset acrylic polymer and from about 25 to about 75 weight percent of at least one ultraviolet light absorber.

23. The article of claim 22 wherein said primer layer contains from about 25 to about 70 weight percent of a thermoset acrylic polymer and from about 30 to about 75 weight percent of at least one ultraviolet light absorbing compound.

24. The article of claim 23 wherein said silanol is $CH_3Si(OH)_3$.

* * * * *